United States Patent [19]

Sejourne et al.

[11] Patent Number: 4,768,207
[45] Date of Patent: Aug. 30, 1988

[54] SYSTEMS FOR RECEIVING MESSAGES TRANSMITTED BY PULSE POSITION MODULATION (PPM)

[75] Inventors: Paul J. Sejourne, Paris; Felix Mizzi, La Courneuve, both of France

[73] Assignee: Societe Anonyme de Telecommunications, France

[21] Appl. No.: 838,149

[22] Filed: Mar. 10, 1986

[30] Foreign Application Priority Data

Mar. 15, 1985 [FR] France .................... 85 03814

[51] Int. Cl.$^4$ .......................................... H03K 9/04
[52] U.S. Cl. ........................................ 375/23; 375/94; 340/825.61; 340/825.64; 307/234; 329/107
[58] Field of Search ............ 375/23, 94, 75, 96; 340/825.64, 825.61, 825.6; 329/107; 307/234; 360/40, 44; 370/10

[56] References Cited

U.S. PATENT DOCUMENTS

| | | | |
|---|---|---|---|
| 2,706,810 | 4/1955 | Jacobsen | 340/825.61 |
| 2,779,933 | 1/1957 | Bradburd | 340/825.61 |
| 2,943,299 | 6/1960 | Dunn . | |
| 3,027,543 | 3/1962 | Losee et al. | 340/825.61 |
| 3,051,928 | 8/1962 | Sullivan | 340/825.61 |
| 3,328,762 | 6/1967 | Prather | 340/825.61 |
| 3,400,369 | 9/1968 | Cooper | 340/825.6 |
| 4,169,264 | 9/1979 | Parker | 307/234 |

FOREIGN PATENT DOCUMENTS

2371843  11/1977  France .

OTHER PUBLICATIONS

IRE Transactions on Space Electronics and Telemetry, Sep./Dec. 1960, pp. 103–114, New York, U.S.; R. Lowrie: "A Secure Digital Command Link".

Primary Examiner—Robert L. Griffin
Assistant Examiner—Marianne Huseman
Attorney, Agent, or Firm—Jacobs & Jacobs

[57] ABSTRACT

The present invention relates to remote control or trajectory calculation systems for missiles for example, and in particular to a message receiving device which may be mounted on the missle itself.

The receiver of the invention comprises means for receiving the j sequences of the message, means for shifting each sequence by a time $\Delta t_j$, means for confirming that the sequences of 1's are indeed associated with sequences of 0's, means for reading the word formed of the j sequences, j being an appropriately chosen integer.

The invention applies to radar responder and any transmission carriers.

6 Claims, 2 Drawing Sheets

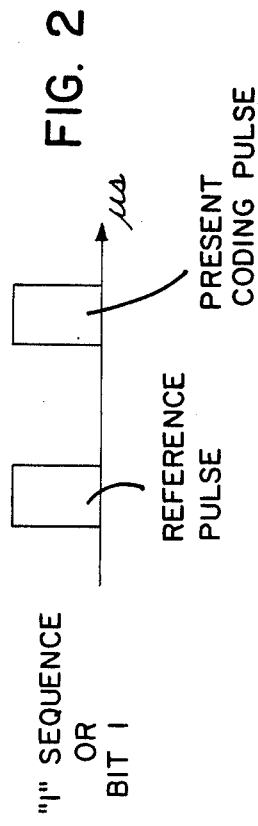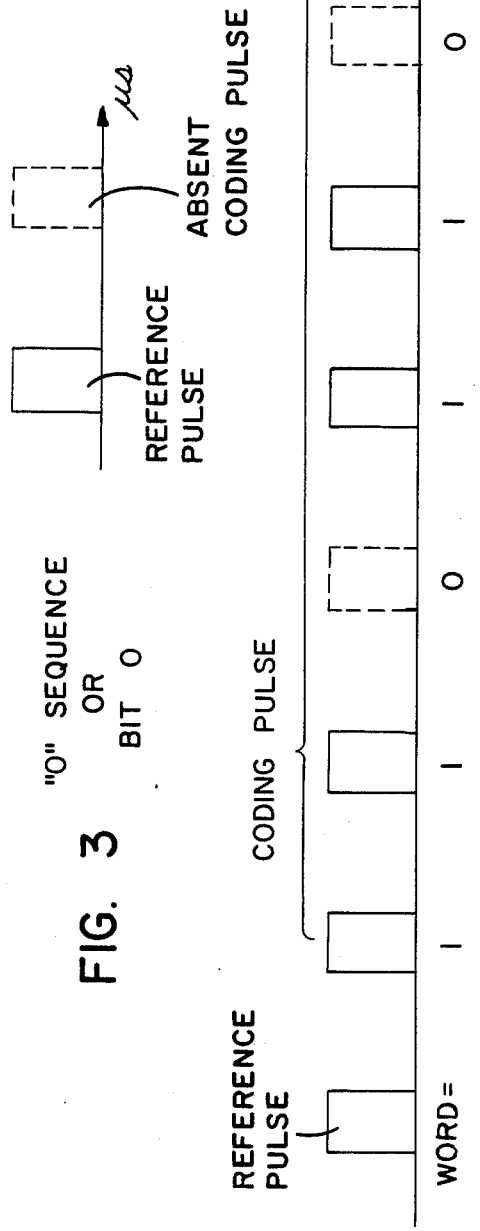

SYSTEMS FOR RECEIVING MESSAGES TRANSMITTED BY PULSE POSITION MODULATION (PPM)

BACKGROUND OF THE INVENTION

1. Field of the Invention

The present invention relates to message transmitting systems for missiles, for example, and more particularly to a message receiving device which may be mounted on the missile itself.

2. Description of the Prior Art

Such systems usually have a function either of remote neutralization or of trajectory calculation. Remote control orders are for example transmitted from a ground station to the missile. An order receiving device mounted on the misile allows these messages to be received and decoded.

These messages may therefore for example have a remote control function or else a maintain function (M) or else a dead-man function (HM) or else an anti-jamming function. These different messages, digital or analog, are well known to a man skilled in the art and will not be further described.

In the case of messages transmitted for example by coded pulses, a sequence $S_i$ is a group of several pulses, for example two, the first being the reference pulse and the second being transmitted a time $\Delta t_i$ later, $\Delta t_i$ depending on the rank of the sequence.

A word is an assembly of several sequences, for example seven.

An order is formed by an assembly of identical words; for an order to be executed, a number of words defined beforehand must be correctly received.

A code is an assembly of several words, for example seven, allowing for example seven missiles to be destroyed separately.

The object of the present invention is to receive these different words of the code and recognize them.

Known devices usually comprise a time counter whose initialization is effected by reception of the first pulse of a sequence. Such known systems are therefore unreliable. In fact, as soon as the time counter has been initialized, it can no longer count any other time interval. These known systems are therefore very sensitive to disturbances, for if the time counter has been initialized by an erroneous pulse, the receiving system is no longer capable of recognizing other pulse groups.

The invention proposes overcoming these defects of known systems and provides a message receiving system, with correlation, using a digital delay line.

SUMMARY OF THE INVENTION

The message receiving device of the invention, with said messages being transmitted by pulse position modulation, that is to say that the position of the different pulses forms the modulation information, comprises means for receiving these messages, said messages being formed of binary words, each word being formed of P sequences, P being a predetermined natural integer, each sequence $S_i$ being formed of at least two pulses, the first pulse being the reference pulse and the second being transmitted a time $\Delta t_i$ later, $\Delta t_i$ depending on the rank of the sequence, the device being characterized by the fact that it comprises means for shifting each pulse received by a time equal to each of said characteristic times $\Delta t_i$, means for correlating said pulses with the first reference pulse, means for deriving therefrom the sequence $S_i$ and means for deriving said message therefrom.

Furthermore, means are advantageously provided for confirming the recognition of a sequence 0 by means of the recognition of a sequence 1.

The means for recognizing a sequence 0 may be adapted for confirming an absence of pulse with respect to a reference pulse authenticated by the presence of the second pulse of a 1 sequence.

The device of the invention preferably comprises means for correlating the pulses received comprising a shift register.

The device of the invention may also comprise means for recognizing the 1 or 0 sequences comprising a plurality of AND gates, said gates receiving the pulses delayed by times $\Delta t_i$ supplied by the outputs of said shift register.

In particular, in the case of a radar receiver, the first so-called reference pulse will be the normal radar pulse.

BRIEF DESCRIPTION OF THE DRAWINGS

Other characteristics and advantages of the invention will be clear from the following drawings:

FIG. 2 diagrammatically depicts a "1" sequence;

FIG. 3 diagrammatically depicts a "0" sequence; and

FIG. 4 diagrammatically depicts a word.

DESCRIPTION OF THE PREFERRED EMBODIMENT

Figure 1:
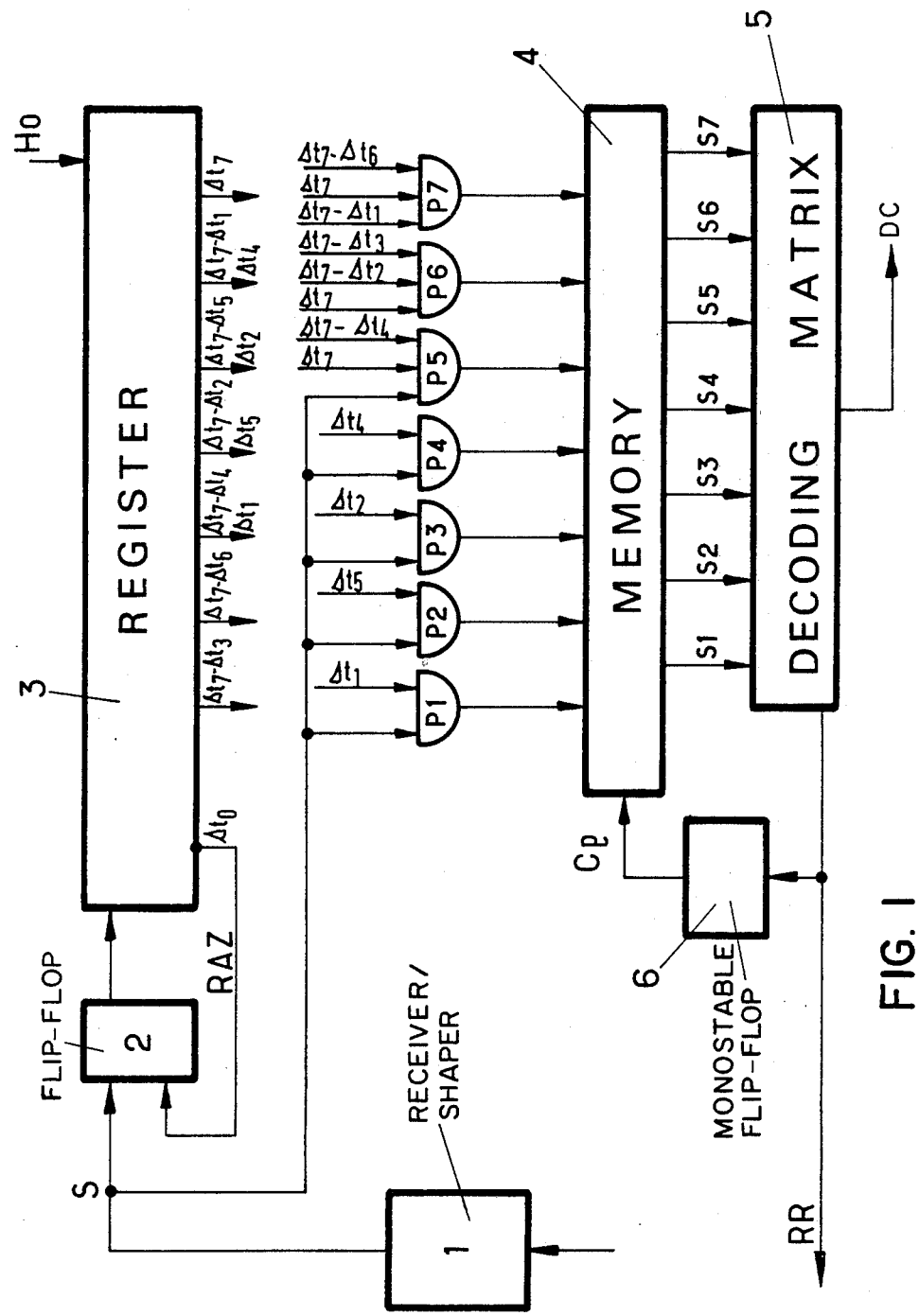
FIG. 1 shows a schematic view of the order receiving device of the invention.

The following description concerns an order receiver integrated with a radar responder. But it is obvious that an order decoder in accordance with the invention could also be applied to other transmission carriers (cables, optical fibers, etc . . . ). In the present description, a group of two pulses will be called a sequence, the first being the normal radar pulse, the second, for coding, being transmitted after the first one, depending on the rank of the sequence, in a time interval smaller than the period of normal radar pulses, and expressed in $\mu$s. The coding pulse is either present or absent, i.e. there is no coding pulse. For ease of description, a sequence whose coding pulse is present is termed a "1" sequence or sequence 1 (see FIG. 2); and a sequence whose coding pulse is absent is termed a "0" sequence or sequence 0 (see FIG. 3). Furthermore, a sequence 1 corresponds to a bit 1 if the two pulses are effectively transmitted, and to a bit 0 if the second coding pulse is absent. Thus, the 0 sequences are fictitious; to be decoded, each of the 0 sequences must be associated with a bit 1 (sequence 1). In other words, the existence of each 0 sequence must be confirmed and authenticated by a 1 sequence.

A word is for example an assembly of seven sequences, four 1 sequences and three 0 sequences, each word being characteristic of a missile.

An order is formed from an assembly of identical words. For this order to be executed, a number of words defined beforehand must be correctly received.

Referring to FIG. 1, the pulses received and validated are received and shaped in device 1. The validated pulses from circuit 1 are applied to the input of a flip-flop 2 which stores the last pulse received, for a time $\Delta t_o$ chosen appropriately. This time $\Delta t_o$ defines the detection window width of a pulse as explained further on. The output of flip-flop 2 is connected to a delay line comprising a shift register 3 composed of a series of flip-flops controlled by a clock $H_o$, e.g. a pulse generator having a clock frequency of 20 MHz. The delay line 3 has a length corresponding to the maximum time interval between the normal pulse and the coding pulse.

The separating power of this delay line must also comply with suitably chosen norms. However, in order to recognize a 0 sequence, it must be associated with a 1 sequence. This verification of the absence of pulse must take place during a precise time interval $\Delta t_i$ which must be located, not with respect to a pulse which might be any parasite, but with respect to a normal pulse authenticated by the presence of the second pulse of a sequence 1. Thus, to illustrate the coding of a word formed for example of seven sequences, it is necessary to carry out a certain processing. Let us consider the following word depicted in FIG. 4 for example:

| Sequences | no 1 | no 2 | no 3 | no 4 | no 5 | no 6 | no 7 |
|---|---|---|---|---|---|---|---|
| Delay ($\Delta t_i$) | $\Delta t_1$ | $\Delta t_2$ | $\Delta t_3$ | $\Delta t_4$ | $\Delta t_5$ | $\Delta t_6$ | $\Delta t_7$ |
| Word | 1 | 1 | 0 | 1 | 1 | 0 | 0 |

First of all the sequence no. 1 is received. The presence of a pulse is checked $\Delta t_1$ after the arrival of the normal coding pulse. With this sequence no. 1 is associated sequence no. 6 which is a 0 and it must be checked, ($\Delta t_6 - \Delta t_1$) after reception of sequence no. 1, that there is indeed absence of a pulse representative of a 0.

Similarly, with sequence no. 2 (1) may be associated sequence no. 3 (0) which may be confirmed ($\Delta t_3 - \Delta t_2$) later.

With sequence no. 4 (1) may be associated sequence no. 7 (0) which arrives ($\Delta t_7 - \Delta t_4$) later. Sequence no. 5 (1) is not associated with another sequence, for all the 0's may be already determined by 1's.

There are then seven sequences to be recognized, three of which are fictitious, i.e. "0" sequences.

A 1 sequence is checked as soon as the second pulse arrives at the input of register 3 so as to avoid jitter of the response. The 0 sequences are checked when the normal pulse arrives at the end of the register which allows a coincidence to be established between the two pulses of sequence 1 and the absence of pulse of sequence 0 to be checked at the same time.

In the case of detecting sequence no. 1 associated with sequence no. 6, the operation of the delay line 3 is the following: the normal pulse delivered by the flip-flop 2 travels through the register 3 and, when it reaches the position corresponding to a delay of $\Delta t_1$, it opens a window of width $\Delta t_0$ which allows the second pulse of sequence no. 1 present at the input of register 3 to be stored in the memory flip-flop 4 and cause a return response to the radar.

The sequence pulse travels in its turn through register 3 with a delay of $\Delta t_1$ with respect to the normal pulse.

When the absence of pulse of the associated sequence (0) arrives at input of register 3, nothing happens; but when the normal pulse arrives at position $\Delta t_7$, it opens a window of $\Delta t_0$; the pulse of the associated sequence 1 then arrives at position ($\Delta t_7 - \Delta t_1$) and also opens a window; the pulse 0 is then in the position ($\Delta t_7 - \Delta t_6$).

To finish decoding, seven AND gates are provided since in the present example seven sequences are to be decoded. Gate $P_1$ then receives the signal from position $\Delta t_1$ of register 3 as well as the undelayed input signal S. The output of this gate $P_1$ is connected to the input of a memory 4 which thus receives the sequence no. 1 of the word which it is desired to decode. It has been seen that, in the chosen word example, it relates to a sequence 1. Gate $P_2$ similarly receives the signal from the $\Delta t_5$ output of register 3 as well as the undelayed input signal S and delivers the sequence no. 5 to the input of memory 4. Similarly, sequence no. 2 is decoded by gate $P_3$ receiving the signal corresponding to the delay $\Delta t_2$. Sequence no. 4 which is also a 1 is decoded by means of the signal from the output of register 3 corresponding to the $\Delta t_4$ delay.

The function of gates $P_5, P_6$ and $P_7$ is essentially to confirm the 0's, i.e. absences of pulses. Gate $P_5$, which must check sequence no. 7 associated with sequence no. 4, will have to check the absence of pulse $\Delta t_7$ after the arrival of the normal pulse. This checking will take place when the normal pulse has reached the $\Delta t_7$ position of register 3. The pulse of sequence no. 4 will then be in the ($\Delta t_7 - \Delta t_4$) position of register 3 and the absence of pulse will be checked at the input of the register at the same time. The three input gate $P_5$ will then have to receive this undelayed signal S, that is corresponding to position ($\Delta t_7 - \Delta t_7$), the signal from the output ($\Delta t_7 - \Delta t_4$) of the register and the $\Delta t_7$ output signal of register 3.

Similarly, gate $P_6$ will receive the pulses from the $\Delta t_7$, ($\Delta t_7 - \Delta t_2$) and ($\Delta t_7 - \Delta t_3$) positions of register 3 and gate $P_7$ will receive the pulses from the $\Delta t_7$, ($\Delta t_7 - \Delta t_1$) and ($\Delta t_7 - \Delta t_6$) outputs of register 3.

Memory 4 stores the different informations coming from gates $P_1$ to $P_7$ until a reading control signal $C_\rho$ orders reading of this memory 4 whose content is then transferred into the decoding matrix 5 which derives therefrom a message DC which, for example, is any message composed of words that are to be sent to any other system, e.g. a telemetry instruction. One of the outputs of this matrix 5 controls, for each sequence 1 received, the sending of a response radar signal RR through the transmitter of the radar responder so as to ensure the trajectory calculation function. This reponse RR also ensures re-initialization of the reading control signal $C_\rho$ through a monostable flip-flop 6. It will be noted that adjustment of the width $\Delta t_0$ of the detection window may for example be obtained by transmitting a reset signal RAZ from the position $\Delta t_0$ of the register 3 to the input of flip-flop 2 or may be provided by any other means known to a man skilled in the art, for example by means of a monostable flip-flop.

Some devices for confirming the decoding of the word contained in register 5 may complete the device of the invention. In particular, it may be useful to deliver the output order DC only after recognition of N identical decoded words, N being adjustable appropriately. Such a feature is not described more fully for it is within the scope of a man skilled in the art.

In the case of application to trajectory calculation, it may be sufficient to detect a single sequence 1 per responder; each sequence 1 may then cause the response of a different missile through the responder.

The invention could be applied in the same way to sequences formed of several pulses. It would be sufficient simply to provide a characteristic interval $\Delta t_k$ separating the pulses K and K+1.

What is claimed is:

1. An arrangement for receiving messages transmitted by pulse position modulation, comprising:
   receiver means for receiving messages formed of binary words, each word being formed of a plurality of sequences arranged in a rank along the respective word, each sequence being formed of a first reference pulse followed by a second present-/absent pulse which is transmitted at a predetermined time after the first reference pulse;

delay means for time shifting each pulse received by the receiver means by a time equal to its respective predetermined time;

correlating means for correlating each time-shifted second present/absent pulse with the first reference pulse of each word;

means for detecting each sequence from the correlated pulses; and means for determining each word and each message from the detected sequences.

2. The arrangement as recited in claim 1, wherein the detecting means includes means for recognizing a sequence having a second absent pulse, means for recognizing a sequence having a second present pulse, and means for confirming the recognition of a sequence having a second absent pulse by the recognition of a sequence having a second present pulse.

3. The arrangement as recited in claim 2, wherein the confirming means includes means for simultaneously detecting the absence of a second absent pulse of a sequence to be confirmed, the presence of a second present pulse of another sequence, and the presence of the first reference pulse.

4. The arrangement as recited in claim 3, wherein the delay means includes a time shifting register having a plurality of time delay outputs.

5. The arrangement as recited in claim 4, wherein the recognizing means includes a plurality of AND gates, each having inputs connected to the time delay outputs of the register.

6. The arrangement as recited in claim 1, wherein the first reference pulse is a normal radar pulse.

* * * * *